United States Patent
Hinoue et al.

(10) Patent No.: US 11,899,388 B2
(45) Date of Patent: Feb. 13, 2024

(54) IMAGE FORMING APPARATUS INCLUDING DEVELOPMENT CARTRIDGE HAVING A DEVELOPMENT MEMORY STORING TONER AMOUNT INFORMATION

(71) Applicant: BROTHER KOGYO KABUSHIKI KAISHA, Nagoya (JP)

(72) Inventors: Kazuma Hinoue, Nagoya (JP); Shintaro Suzuki, Nagoya (JP); Sota Hirano, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/748,376

(22) Filed: May 19, 2022

(65) Prior Publication Data

US 2022/0276601 A1  Sep. 1, 2022

Related U.S. Application Data (63) Continuation of application No. PCT/JP2020/043387, filed on Nov. 20, 2020.

(30) Foreign Application Priority Data

Nov. 21, 2019  (JP) ................................ 2019-210306

(51) Int. Cl.
*G03G 15/08* (2006.01)
*G03G 21/00* (2006.01)
(Continued)

(52) U.S. Cl.
CPC ....... *G03G 15/556* (2013.01); *G03G 15/0863* (2013.01); *G03G 15/0877* (2013.01);
(Continued)

(58) Field of Classification Search
CPC ............. G03G 15/556; G03G 15/0863; G03G 21/1875; G03G 21/1878;
(Continued)

(56) References Cited

U.S. PATENT DOCUMENTS

| | | | |
|---|---|---|---|
| 6,175,375 B1 | 1/2001 | Able et al. | |
| 6,754,454 B1 * | 6/2004 | Hiroshima | G03G 21/1889 399/25 |

(Continued)

FOREIGN PATENT DOCUMENTS

| | | | |
|---|---|---|---|
| JP | 2002-351270 A | 12/2002 | |
| JP | 2004-139046 A | 5/2004 | |

(Continued)

OTHER PUBLICATIONS

International Search Report issued in corresponding International Patent Application No. PCT/JP2020/043387, dated Feb. 9, 2021.

(Continued)

*Primary Examiner* — Robert B Beatty
(74) *Attorney, Agent, or Firm* — Merchant & Gould P.C.

(57) ABSTRACT

An image forming apparatus includes a main body, a development cartridge, a toner cartridge, and a controller. The development cartridge includes a development roller, a development chamber, and a development memory. The toner cartridge includes a case in which toner is stored, a toner supply unit configured to supply toner from the case into the development chamber, and a toner memory. The controller stores, in the development memory, information regarding a cumulative received toner amount and a cumulative toner consumption amount. The controller subtracts the cumulative toner consumption amount from the cumulative received toner amount to find a difference, and causes the toner supply unit to supply a first predetermined amount of toner into the development chamber when the difference (Continued)

is equal to or smaller than a first threshold value. The controller stores, in the toner memory, information regarding the cumulative supplied toner amount.

16 Claims, 10 Drawing Sheets

(51) Int. Cl.
    *G03G 15/00* (2006.01)
    *G03G 21/18* (2006.01)
    *G06K 15/00* (2006.01)

(52) U.S. Cl.
    CPC . *G03G 21/1878* (2013.01); *G03G 2215/0697* (2013.01); *G03G 2221/1823* (2013.01); *G06K 15/4075* (2013.01)

(58) Field of Classification Search
    CPC ... G03G 2215/0695; G03G 2215/0697; G03G 2221/1823; G03G 15/0877; G06K 15/4075
    USPC .............................................. 399/27, 61, 258
    See application file for complete search history.

(56) References Cited

U.S. PATENT DOCUMENTS

| | | | |
|---|---|---|---|
| 6,957,023 B2 | 10/2005 | Kinoshita et al. | |
| 7,181,147 B2 | 2/2007 | Kinoshita et al. | |
| 2003/0021609 A1* | 1/2003 | Yamaguchi | G03G 15/0849 399/27 |
| 2004/0062559 A1 | 4/2004 | Kinoshita et al. | |
| 2004/0091275 A1* | 5/2004 | Matsuda | G03G 15/0849 399/27 |
| 2005/0019047 A1* | 1/2005 | Katoh | G03G 15/065 399/27 |
| 2005/0196185 A1 | 9/2005 | Kinoshita et al. | |
| 2009/0060533 A1* | 3/2009 | Yamaguchi | G03G 15/556 399/27 |
| 2013/0108282 A1* | 5/2013 | Sonoda | G03G 21/1889 399/26 |
| 2014/0029962 A1 | 1/2014 | Shimizu et al. | |
| 2014/0133873 A1* | 5/2014 | Nishikawa | G03G 15/0856 399/27 |
| 2016/0097991 A1 | 4/2016 | Oshima et al. | |
| 2017/0285560 A1 | 10/2017 | Shimizu et al. | |
| 2022/0365470 A1* | 11/2022 | Hinoue | G03G 15/0863 |

FOREIGN PATENT DOCUMENTS

| | | |
|---|---|---|
| JP | 2006-171296 A | 6/2006 |
| JP | 2007-292803 A | 11/2007 |
| JP | 2010-152109 A | 7/2010 |
| JP | 2011-43580 A | 3/2011 |
| JP | 2014-26045 A | 2/2014 |
| JP | 2016-71285 A | 5/2016 |
| JP | 2017-181946 A | 10/2017 |

OTHER PUBLICATIONS

International Preliminary Report issued in corresponding International Patent Application No. PCT/JP2020/043387, dated May 17, 2022.

The First Office Action issued in counterpart Japanese Patent Application No. 2019-210306, dated Aug. 29, 2023.

* cited by examiner

IMAGE FORMING APPARATUS INCLUDING DEVELOPMENT CARTRIDGE HAVING A DEVELOPMENT MEMORY STORING TONER AMOUNT INFORMATION

CROSS-REFERENCE TO RELATED APPLICATION(S)

This application is a continuation of International Application No. PCT/JP2020/043387 filed on Nov. 20, 2020, which claims priority from Japanese Patent Application No. 2019-210306 filed on Nov. 21, 2019, the disclosures of which are incorporated herein by reference in their entirety.

TECHNICAL FIELD

This disclosure relates to an image forming apparatus in which a development cartridge and a toner cartridge are installable.

BACKGROUND ART

An image forming apparatus in which a development cartridge and a toner cartridge are installable is known in the art. The development cartridge includes a development device for supplying toner to a photoconductor drum. The toner cartridge includes a toner container in which toner is held. The toner is supplied to the development device from the toner cartridge on an as-needed basis. In this technical scheme, the consumption of toner may be computed based on a dot count, and the toner is supplied to the development device based on the consumption of toner as computed so that the amount of toner in the development device is kept as specified.

SUMMARY

In the conventional art, the development cartridge or the toner cartridge does not have information storage medium (for example, memory); therefore, information regarding the amount of toner supplied to the development device, the amount of toner consumed for image forming process, or the amount of toner supplied from the toner cartridge to the development device cannot be stored in the information storage medium. Therefore, when a development cartridge or a toner cartridge is replaced before expiration of its life, or a development cartridge or a toner cartridge removed before expiration of its life is installed again, the amount of toner remaining in the cartridge cannot be confirmed precisely.

It would be desirable to provide an image forming apparatus in which the amounts of toner remaining in a development cartridge and a toner cartridge can be confirmed even if the development cartridge or the toner cartridge is replaced before expiration of its life and a development cartridge or toner cartridge removed before expiration of its life is installed again.

In one aspect, an image forming apparatus comprising a main body, a development cartridge, a toner cartridge, and a controller is disclosed herein. The development cartridge is installable in the main body. The development cartridge comprises a development roller, a development chamber in which toner is storable, and a development memory. The toner cartridge is installable in the development cartridge. The toner cartridge comprises a case in which toner is stored, a toner supply unit configured to supply toner from the case into the development chamber, and a toner memory.

The controller is configured to store, in the development memory, information regarding a cumulative received toner amount that is a cumulative amount of toner supplied from the case and received in the development chamber, and a cumulative toner consumption amount that is a cumulative amount of consumed toner.

The controller is configured to subtract the cumulative toner consumption amount from the cumulative received toner amount to find a difference, and cause the toner supply unit to supply a first predetermined amount of toner into the development chamber when the difference is equal to or smaller than a first threshold value.

The controller is configured to store, in the toner memory, information regarding a cumulative supplied toner amount that is a cumulative amount of toner supplied by the toner supply unit from the case into the development chamber.

BRIEF DESCRIPTION OF THE DRAWINGS

The above and other aspects, their advantages and further features will become more apparent by describing in detail illustrative, non-limiting embodiments thereof with reference to the accompanying drawings, in which.

DESCRIPTION OF EMBODIMENTS

Figure 1:
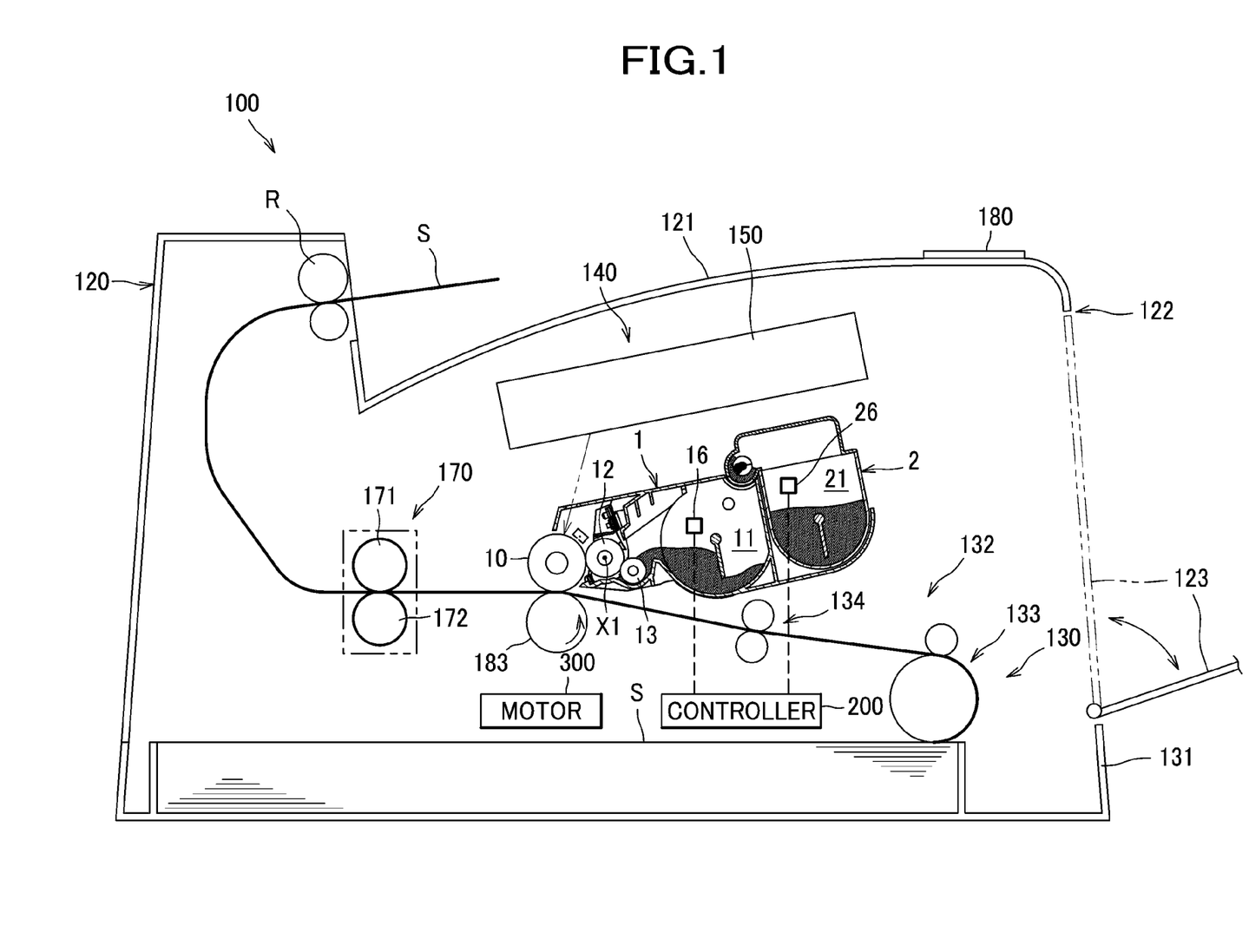
FIG. 1 is a section view of an image forming apparatus.

As shown in FIG. 1, an image forming apparatus 100 is a laser printer. The image forming apparatus 100 includes a main body 120, a sheet feeder unit 130, an image forming unit 140, a display 180, a controller 200, and a motor 300. The sheet feeder unit 130 feeds a sheet S. The image forming unit 140 forms an image on a sheet S. The driving force of the motor 300 is transmitted to the sheet feeder unit 130 and the image forming unit 140.

The sheet feeder unit 130 includes a sheet feed tray 131 and a conveyor mechanism 132. The sheet feed tray 131 is installed in a lower part of the main body 120. The sheet feed tray 131 is removable from the main body 120, and installable into the main body 120. The conveyor mechanism 132 conveys a sheet S in the sheet feed tray 131 toward a transfer roller 183 which will be described later. The conveyor mechanism 132 includes a sheet feed mechanism 133 and a registration roller 134. The sheet feed mechanism 133 conveys a sheet S in the sheet feed tray 131 toward the registration roller 134. The registration roller 134 aligns a position of a leading edge of a sheet S conveyed by the sheet feed mechanism 133.

The image forming unit 140 includes a development cartridge 1, a scanner unit 150, a fixing device 170, and a transfer roller 183.

The scanner unit 150 is provided in an upper part of the main body 120, and includes a laser light emitting part, a polygon mirror, lenses, reflecting mirrors, etc. (not shown). This scanner unit 150 irradiates and rapidly scans the surface of a photoconductor drum 10, which will be described later, with a laser beam.

The main body 120 includes an opening 122 and a front cover 123. The front cover 123 is swingably provided on the front wall of the main body 120. The opening 122 can be closed and opened by the front cover 123. The development cartridge 1 is detachable from and installable into the main body 120 through the opening 122. A detailed description of the development cartridge 1 will be given later.

In the image forming unit 140, the surface of the rotating photoconductor drum 10 is uniformly charged by a charger 10B (see FIG. 2) which will be described later, rapidly scanned with, and exposed to, a laser beam emitted from the scanner unit 150. In this way, an electrostatic latent image formulated according to image data is formed on the surface of the photoconductor drum 10.

Subsequently, toner stored in the development cartridge 1 is supplied to the electrostatic latent image of the photoconductor drum 10, and a toner image is formed on the surface of the photoconductor drum 10. Thereafter, a sheet S is conveyed through between the photoconductor drum 10 and the transfer roller 183, and the toner image carried on the surface of the photoconductor drum 10 is transferred onto the sheet S.

The fixing device 170 includes a heating roller 171, and a pressure roller 172 pressed against the heating roller 171. In this fixing device 170, toner transferred on the sheet S is thermally fixed on the sheet S while the sheet S passes through between the heating roller 171 and the pressure roller 172.

The sheet S on which the toner image has been thermally fixed in the fixing device 170 is conveyed to a sheet output roller R provided in a position downstream of the fixing device, and ejected via the sheet output roller R out onto the sheet output tray 121.

The display 180 is located at an outer surface of the main body 120. The display 180 displays various messages based on instructions provided by the controller 200.

Figure 2:
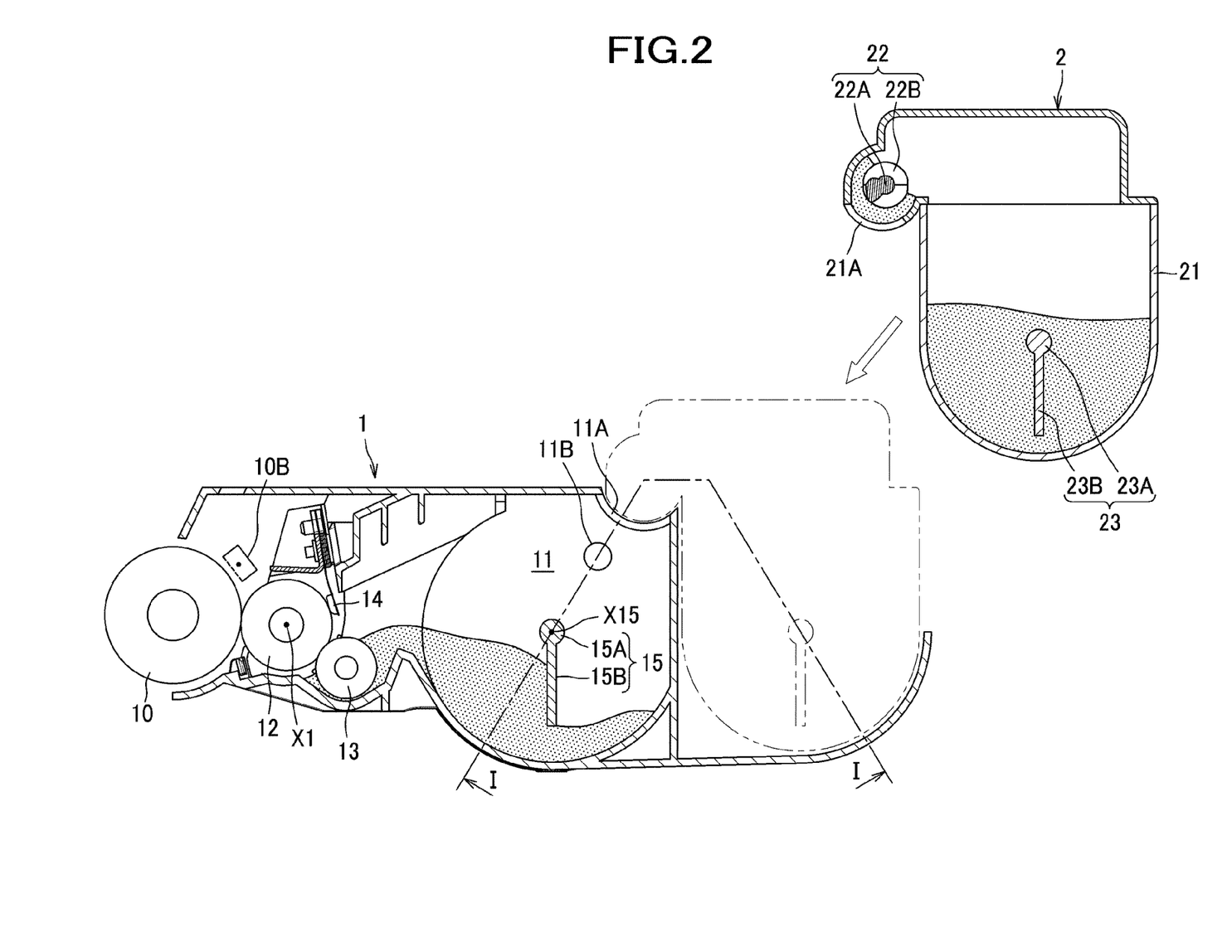
FIG. 2 is a section view of a development cartridge and a toner cartridge to be installed in the development cartridge.

As shown in FIG. 2, the development cartridge 1 includes a photoconductor drum 10, a charger 10B, a development chamber 11, a development roller 12, a supply roller 13, a doctor blade 14, a first agitator 15, and a development memory 16 (see also FIG. 1). In the development chamber 11, toner is storable.

The development roller 12 is a roller that supplies toner to an electrostatic latent image formed on the photoconductor drum 10. The development roller 12 is rotatable about a rotation axis X1. In the following description, a direction of extension of the rotation axis X1 is referred to simply as "axial direction".

The supply roller 13 is a roller that supplies toner stored in the development chamber 11 to the development roller 12.

The doctor blade 14 is a member that regulates the thickness of toner on the development roller 12.

The first agitator 15 includes a shaft 15A and an impeller vane 15B. The shaft 15A is rotatable about a first axis X15 extending in the axial direction. The impeller vane 15B is fixed to the shaft 15A. The shaft 15A is rotatably supported in the development chamber 11. The impeller vane 15B rotates together with the shaft 15A to agitate toner in the development chamber 11.

The development memory 16 is a memory, such as an IC chip but not limited thereto, that stores information. In this embodiment, the development memory 16 stores information regarding a cumulative received toner amount and a cumulative toner consumption amount. The cumulative received toner amount is a cumulative amount of toner supplied from the toner cartridge 2 and received in the development chamber 11. The cumulative toner consumption amount is a cumulative amount of toner consumed by image formation.

Figure 3:
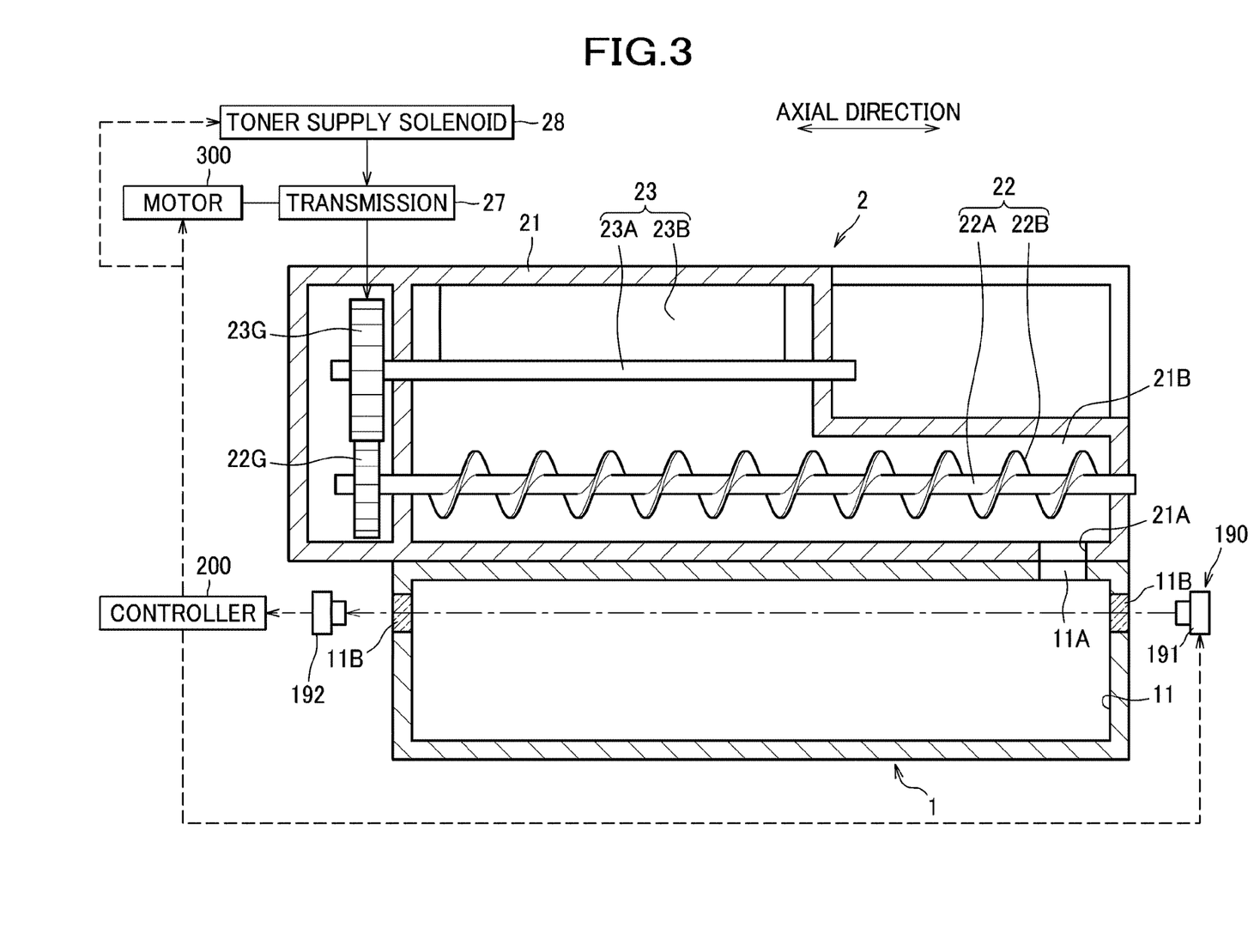
FIG. 3 is a section view taken along line I-I of FIG. 2.

As shown in FIG. 3, the image forming apparatus 100 includes a toner sensor 190 for detecting an amount of toner in the development chamber 11. The toner sensor 190 includes a light-emitting element 191 and a photosensor 192. The light-emitting element 191 emits light to the inside of the development chamber 11. The photosensor 192 receives light that has been emitted from the light-emitting element 191 and passed through the inside of the development chamber 11. The light-emitting element 191 and the photosensor 192 are provided at the main body 120. To be more specific, the light-emitting element 191 is located at an outer side, facing to one side (one of two sides apart from each other in the axial direction), of the development chamber 11, and the photosensor 192 is located at an outer side, facing to the other side (the other of the two sides apart from each other in the axial direction; i.e., the side opposite to the one side), of the development chamber 11.

The development chamber 11 includes windows 11B to allow light emitted from the light-emitting element 191 to pass therethrough. The windows 11B are provided in walls, at the two sides apart from each other in the axial direction, of the development chamber 11. The windows 11B are made of material that transmits light emitted from the light-emitting element 191. The walls of the development chamber 11 at the two sides apart from each other in the axial direction are made of material that does not transmit light. As shown in FIG. 2, the windows 11B are located above the first axis X15. Thus, light emitted from the light-emitting element 191 passes at a height higher than the first axis X15 and lower than an auger 22 which will be described later.

The toner cartridge 2 is removable from and installable into the development cartridge 1 (see FIG. 2). The toner cartridge 2 installed in the development cartridge 1 is installable into the main body 120. The development cartridge 1 is, even if no toner cartridge 2 is installed therein, installable into the main body 120. The toner cartridge 2 includes a case 21, an auger 22, a second agitator 23, and a toner memory 26 (see also FIG. 1). The case 21 stores toner. The auger 22 is an example of a toner supply unit configured to supply toner from the case 21 into the development chamber 11. The second agitator 23 agitates toner in the case 21.

The auger 22 is rotatable about a rotation axis extending in the axial direction, and thus capable of conveying toner in the inside of the case 21 in one direction parallel to the axial direction by rotation. To be more specific, the auger 22 is a screw auger having a shaft 22A and a blade 22B provided in a helical shape around the shaft 22A. The blade 22B of the auger 22 is formed integrally with the shaft 22A in one piece.

The case 21 includes an outlet 21A and a toner conveyor part 21B. The outlet 21A is an opening through which toner in the case 21 is fed into the development cartridge 1. The toner conveyor part 21B surrounds the periphery of the auger 22. The toner conveyor part 21B is smaller in diameter and located closer to the periphery of the auger 22 than other parts of the case 21.

The development chamber 11 of the development cartridge 1 has an inlet 11A facing the outlet 21A of the case 21. The outlet 21A and the inlet 11A are located in a position closer to one of two ends of the auger 22 in the axial direction (than the other one of the two ends of the auger 22) and lower than the auger 22. Accordingly, as shown in FIG. 3, when the auger 22 rotates, toner is conveyed by the helical blade 22B toward the one end in the axial direction, and supplied through the outlet 21A and the inlet 11A into the development chamber 11.

The auger 22 further includes an auger gear 22G. The auger gear 22G is a gear provided to transmit a driving force to the auger 22, and fixed on the shaft 22A of the auger 22. Accordingly, the auger 22 is rotatable together with the auger gear 22G.

The second agitator 23 includes a shaft 23A extending in the axial direction, and an impeller vane 23B provided on the shaft 23A. The second agitator 23 further includes a second agitator gear 23G. The second agitator gear 23G is fixed on an end portion of the shaft 23A. The second agitator gear 23G meshes with the auger gear 22G. Accordingly, rotation of the auger gear 22G causes the second agitator 23 to rotate together with the second agitator gear 23G.

The driving force of the motor 300 is transmitted via a transmission 27 to the auger gear 22G. The transmission 27 is configured to transmit the driving force of the motor 300 to the auger gear 22G when a toner supply solenoid 28 is turned on, while the driving force of the motor 300 is not transmitted to the auger gear 22G by the transmission 27 when the toner supply solenoid 28 is turned off. The toner supply solenoid 28 is turned on and off under control of the controller 200. Accordingly, if the controller 200 turns on the toner supply solenoid 28, then the auger 22 rotates, so that toner in the case 21 is supplied into the development chamber 11. If the controller 200 turns off the toner supply solenoid 28, then the auger 22 does not rotate, so that toner in the case 21 is not supplied into the development chamber 11.

The toner memory 26 is a memory, such as an IC chip but not limited thereto, that stores information. In this embodiment, the toner memory 26 stores information regarding a cumulative supplied toner amount. The cumulative supplied toner amount is a cumulative amount of toner supplied by the auger 22 from the case 21 into the development chamber 11.

Figure 4:
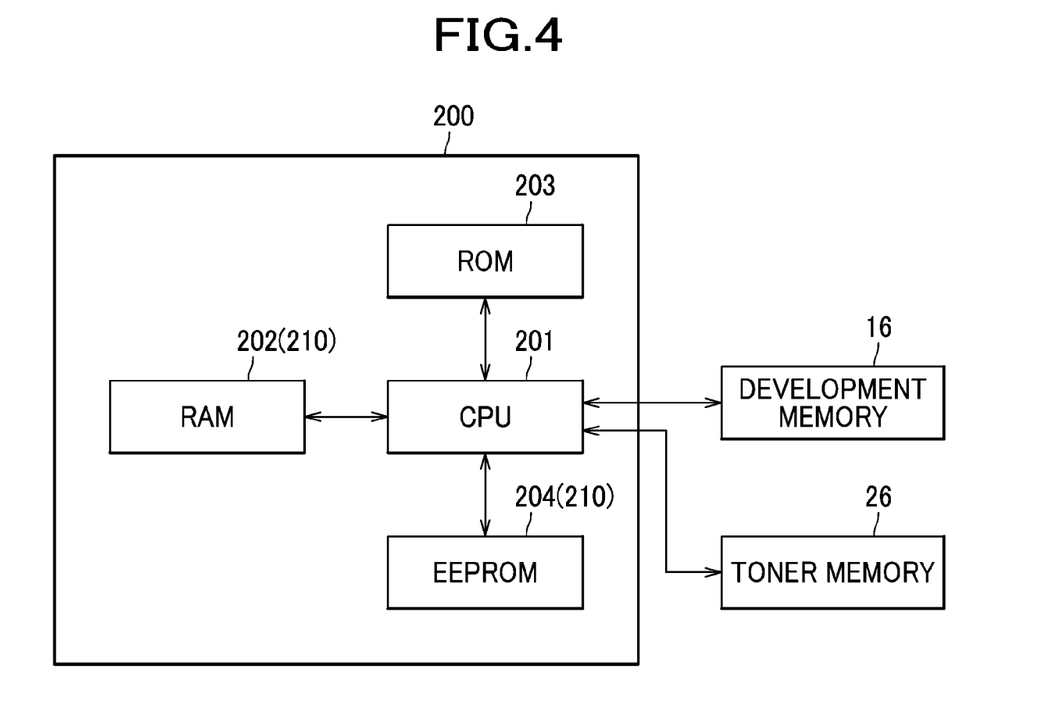
FIG. 4 is a diagram for explaining an electric connection between a main memory and a drum memory and a toner memory.

As shown in FIG. 4A, the controller 200 includes a central processing unit or CPU 201, a random-access memory or RAM 202, a read-only memory or ROM 203, an electrically erasable, programmable read-only memory or EEPROM 204, and an input/output circuit, and executes a printing control by executing arithmetic and logic operations based on information, stored in the memories (development memory 16 and toner memory 26), of the installed cartridges (development cartridge 1 and toner cartridge 2) and/or programs and data stored in the RAM 202, ROM 203 and the like. The RAM 202 and the EEPROM 204 are examples of a main memory 210. The RAM 202 is an example of a volatile memory. The EEPROM 204 is an example of a nonvolatile memory. In this embodiment, the CPU 201 is electrically connected to the RAM 202, the ROM 203, the EEPROM 204, the development memory 16 and the toner memory 26.

Next, a detailed description will be given of processes executed by the controller 200. First, a general flow of the processes executed by the controller 200 will be described, and a specific example of each process executed by the controller 200 according to an illustrative, non-limiting embodiment will be described.

The controller 200 executes any one of a normal printing process, a toner exhaustion control process, and a special printing process, as selected according to a remaining amount of toner in the toner cartridge 2.

Figure 5:
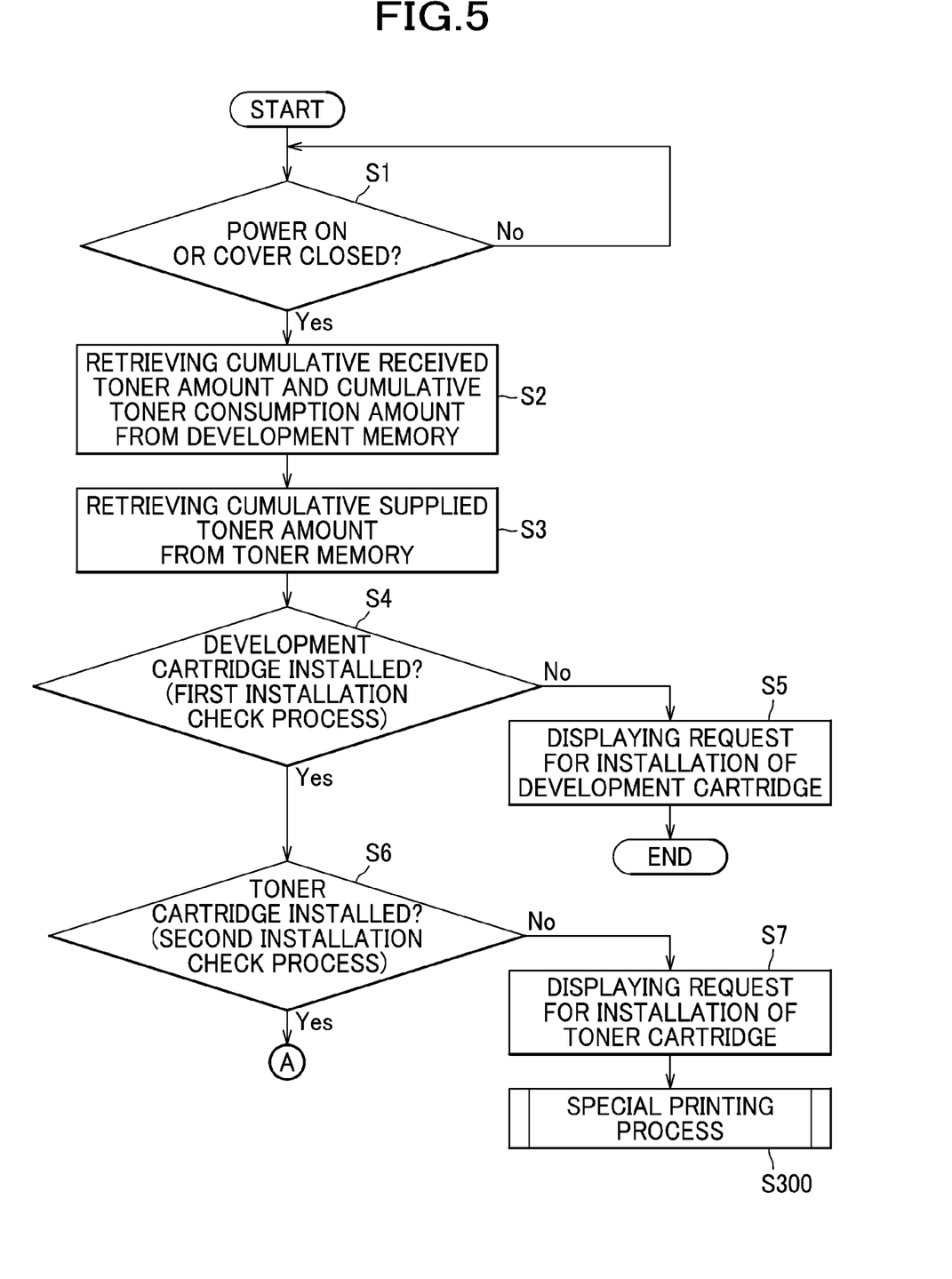
FIG. 5 is a flowchart showing an operation to be executed by a controller after power is turned on or a cover is closed.

Specifically, when the controller 200 determines that the power has been turned on, or the front cover 123 has been closed, the controller 200, assuming that at least one of the development cartridge 1 or the toner cartridge 2 has been changed, retrieves information regarding the cumulative received toner amount and the cumulative toner consumption amount from the development memory 16, retrieves information regarding the cumulative supplied toner amount from the toner memory 26, and executes a first installation check process and a second installation check process (see steps S1 to S6 in FIG. 5).

The first installation check process is a process of determining whether a development cartridge 1 is installed in the main body 120. To be more specific, the controller 200 attempts to establish communication with the development memory 16 to retrieve information from the development memory 16. When the controller 200 determines that establishing the communication has succeeded, the controller 200 determines that the development cartridge 1 is installed in the main body 120. When the controller 200 determines that no development cartridge 1 is installed in the main body 120, the controller 200 causes the display 180 to show a representation for requesting installation of a development cartridge 1.

The second installation check process is a process of determining whether a toner cartridge 2 is installed in the development cartridge 1. To be more specific, the controller 200 attempts to establish communication with the toner memory 26 to retrieve information from the toner memory 26. When the controller 200 determines that establishing the communication has succeeded, the controller 200 determines that the toner cartridge 2 is installed in the development cartridge 1. When the controller 200 determines that a development cartridge 1 is installed in the main body 120 in the first installation check process and does not determine that a toner cartridge 2 is installed in the development cartridge 1 in the second installation check process, the controller 200 causes the display 180 to show a representation for requesting installation of a toner cartridge 2, and executes the special printing process (see step 300 in FIG. 10).

Figure 6:
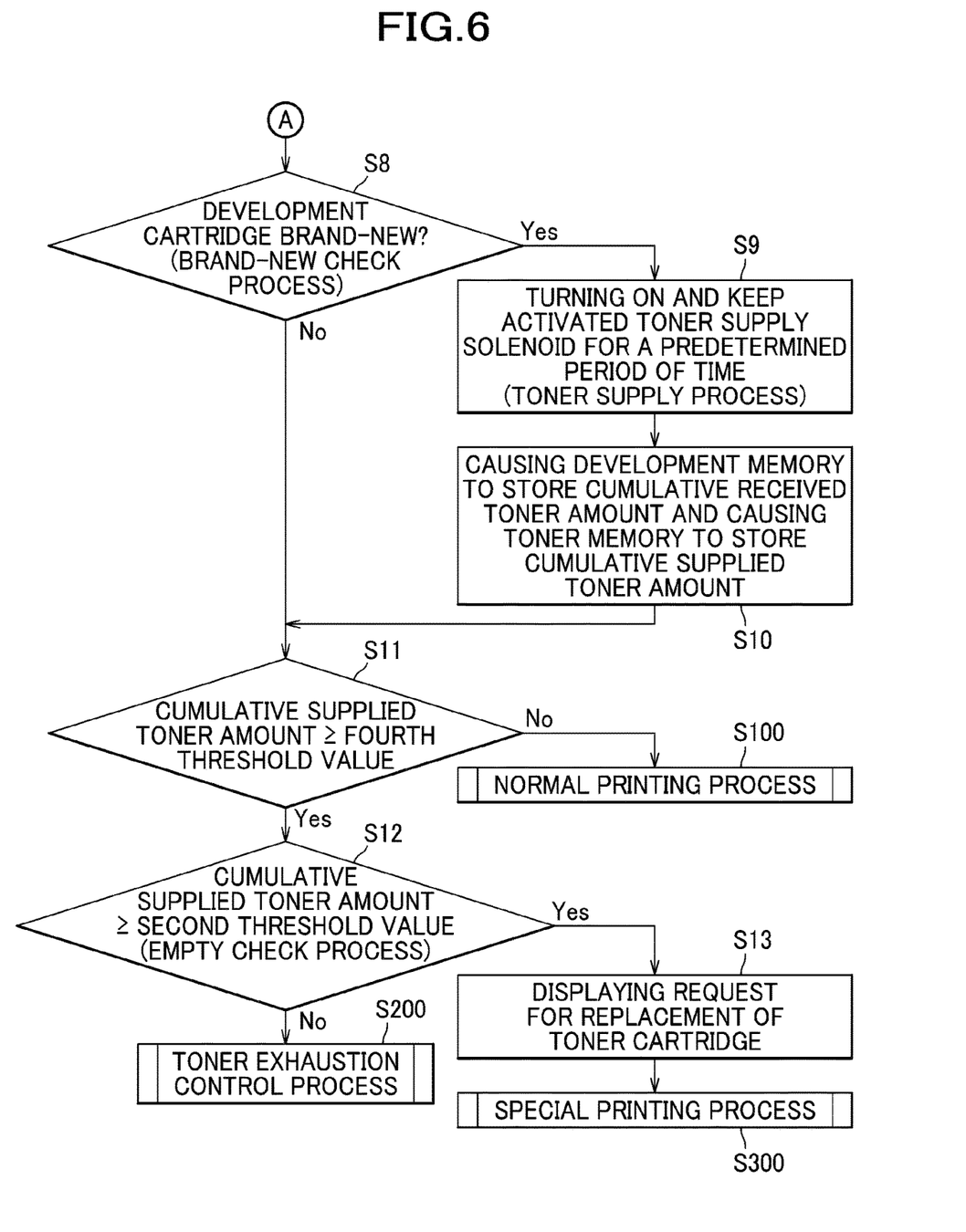
FIG. 6 is a flowchart showing the process continued from the flowchart of FIG. 5.

When the controller 200 determines that the development cartridge 1 and the toner cartridge 2 are installed, the controller 200 proceeds to execute a brand-new check process of determining whether the development cartridge 1 installed in the main body 120 is brand-new (see step S8 in FIG. 6). For example, the controller 200 may be configured to determine, when a cumulative received toner amount retrieved from the development memory 16 is zero, that the development cartridge 1 installed in the main body 120 is brand-new.

When the controller 200 determines, in the brand-new check process, that the development cartridge 1 installed in the main body 120 is brand-new, the controller 200 turns on the toner supply solenoid 28 and keeps it activated for a predetermined period of time to execute a toner supply process of causing the auger 22 to supply a second predetermined amount of toner into the development chamber 11 (see step S9 in FIG. 6). Then, the controller 200 stores, in the development memory 16, the second predetermined amount as information regarding the cumulative received toner amount, adds the second predetermined amount to the cumulative supplied toner amount retrieved from the toner memory 26 in step S3 to find the sum and stores, in the toner memory 26, the sum as updated information regarding the cumulative supplied toner amount. (S10).

When the controller 200 determines, in the brand-new check process, that the development cartridge 1 installed in the main body 120 is not brand-new, the controller 200 determines whether the cumulative supplied toner amount retrieved from the toner memory 26 is equal to or greater than a fourth threshold value.

Figure 7:
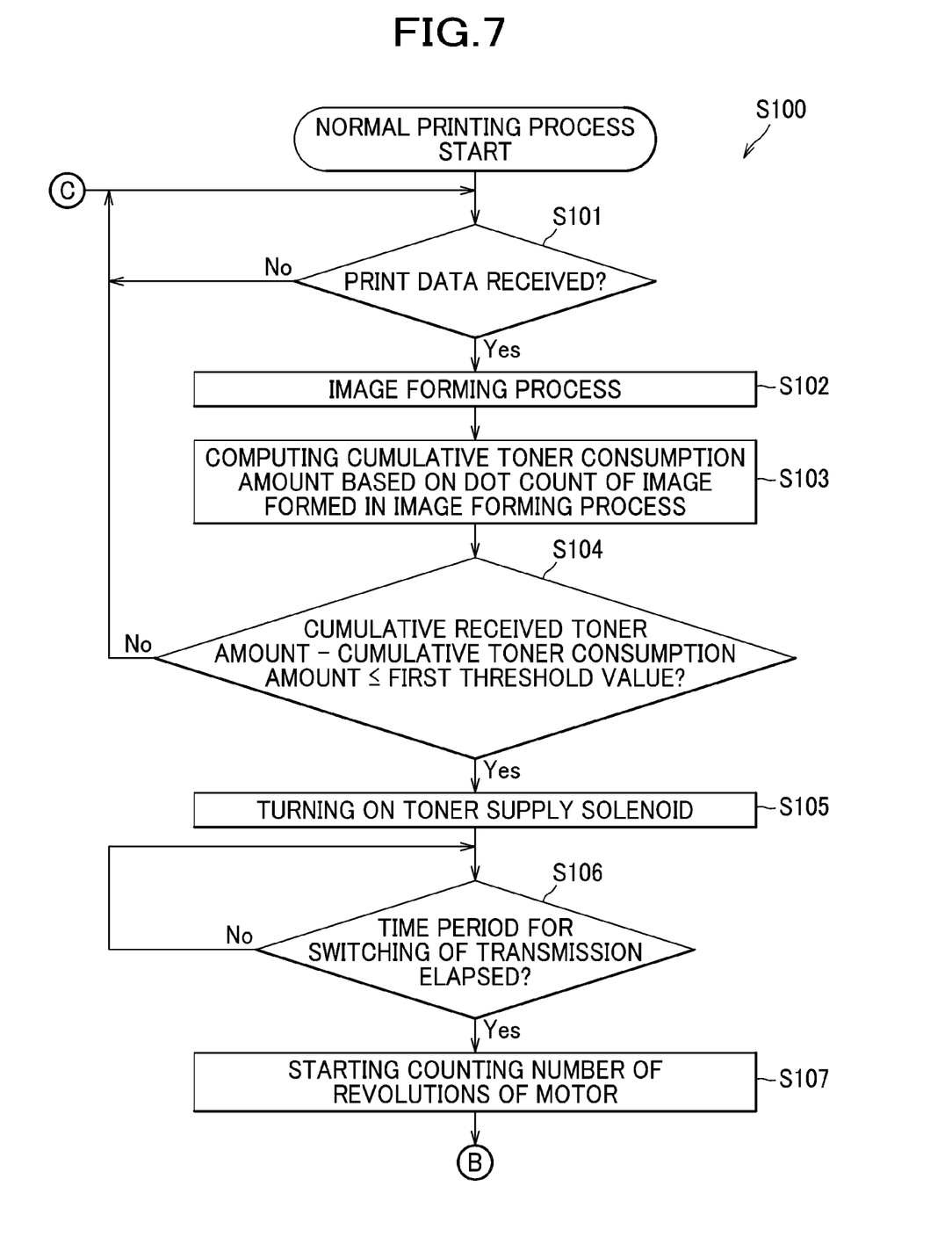
FIG. 7 is a flowchart showing a normal printing process.

When the cumulative supplied toner amount is not equal to or greater than the fourth threshold value, the controller 200 proceeds to execute the normal printing process (see step S100 in FIG. 7). On the other hand, when the cumulative supplied toner amount is equal to or greater than the fourth threshold value, the controller 200 proceeds to execute an empty check process of determining whether the cumulative supplied toner amount is equal to or greater than a second threshold value for determining whether the toner cartridge 2 is empty (see step S12 in FIG. 6). The second threshold value is a value greater than the fourth threshold value.

When the cumulative supplied toner amount is equal to or greater than the second threshold value, the controller 200 causes the display 180 to show a representation for requesting installation of a toner cartridge 2, and executes the special printing process. On the other hand, when the cumulative supplied toner amount is smaller than the second threshold value, the controller 200 proceeds to execute the toner exhaustion control process (see step S220 in FIG. 9).

Next, the normal printing process (see FIG. 7 and FIG. 8) is described below. The normal printing process is a printing process the controller 200 normally executes when there is toner remaining in the toner cartridge 2.

Specifically, in the normal printing process, the controller 200 executes an image forming process based on print data, and computes a cumulative toner consumption amount based on a dot count of an image formed in the image forming process.

Figure 8:
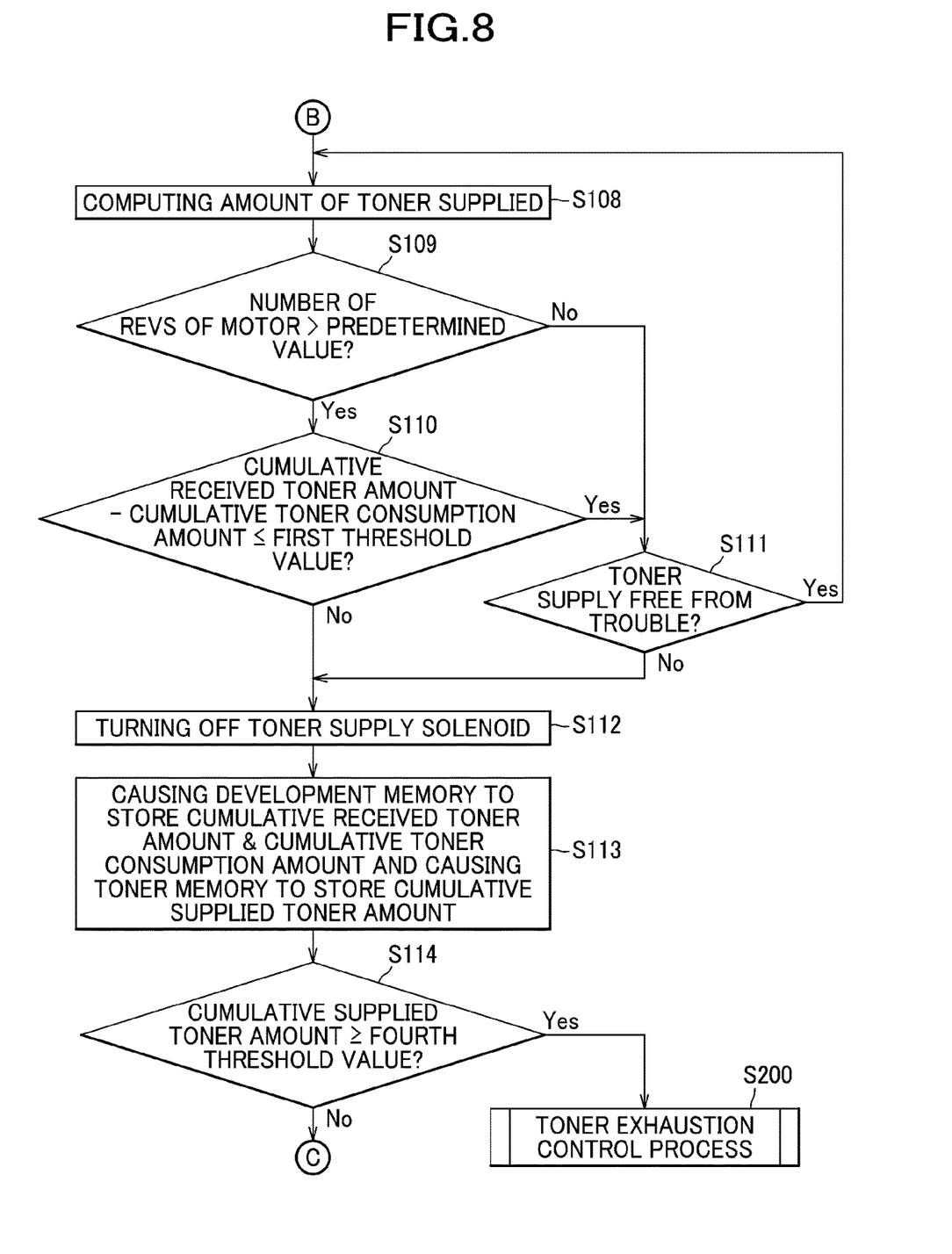
FIG. 8 is a flowchart showing the process continued from the flowchart of FIG. 7.

The controller 200 subtracts the computed cumulative toner consumption amount from the cumulative received toner amount stored in the development memory 16 to find a difference, and when the difference is equal to or smaller than a first threshold value, then activates and causes the auger 22 to supply a first predetermined amount of toner into the development chamber 11 (see steps S105 to S112 in FIG. 7 and FIG. 8). The first threshold value is a threshold value determined based on an ideal amount of toner to be stored in the development chamber 11 when the image forming process is executed. The cumulative supplied toner amount is computed based on the number of rotations of the motor 300 by which the auger 22 is caused to rotate. The cumulative received toner amount is an accumulated value computed by adding up an amount of toner supplied by the auger 22 of the toner cartridge 2 installed in the development cartridge 1.

When the cumulative supplied toner amount is not equal to or greater than the fourth threshold value, the controller 200 repeats execution of the normal printing process, and once the cumulative supplied toner amount becomes equal to or greater than the fourth threshold value, the controller 200 proceeds to execute the toner exhaustion control process.

Next, the toner exhaustion control process (see step S200 in FIG. 9) is described below. The toner exhaustion control process is a process, executed when toner remaining in the case 21 of the toner cartridge 2 is running short, of supplying toner into the development chamber 11 until toner remaining in the case 21 of the toner cartridge 2 is exhausted completely.

Figure 9:
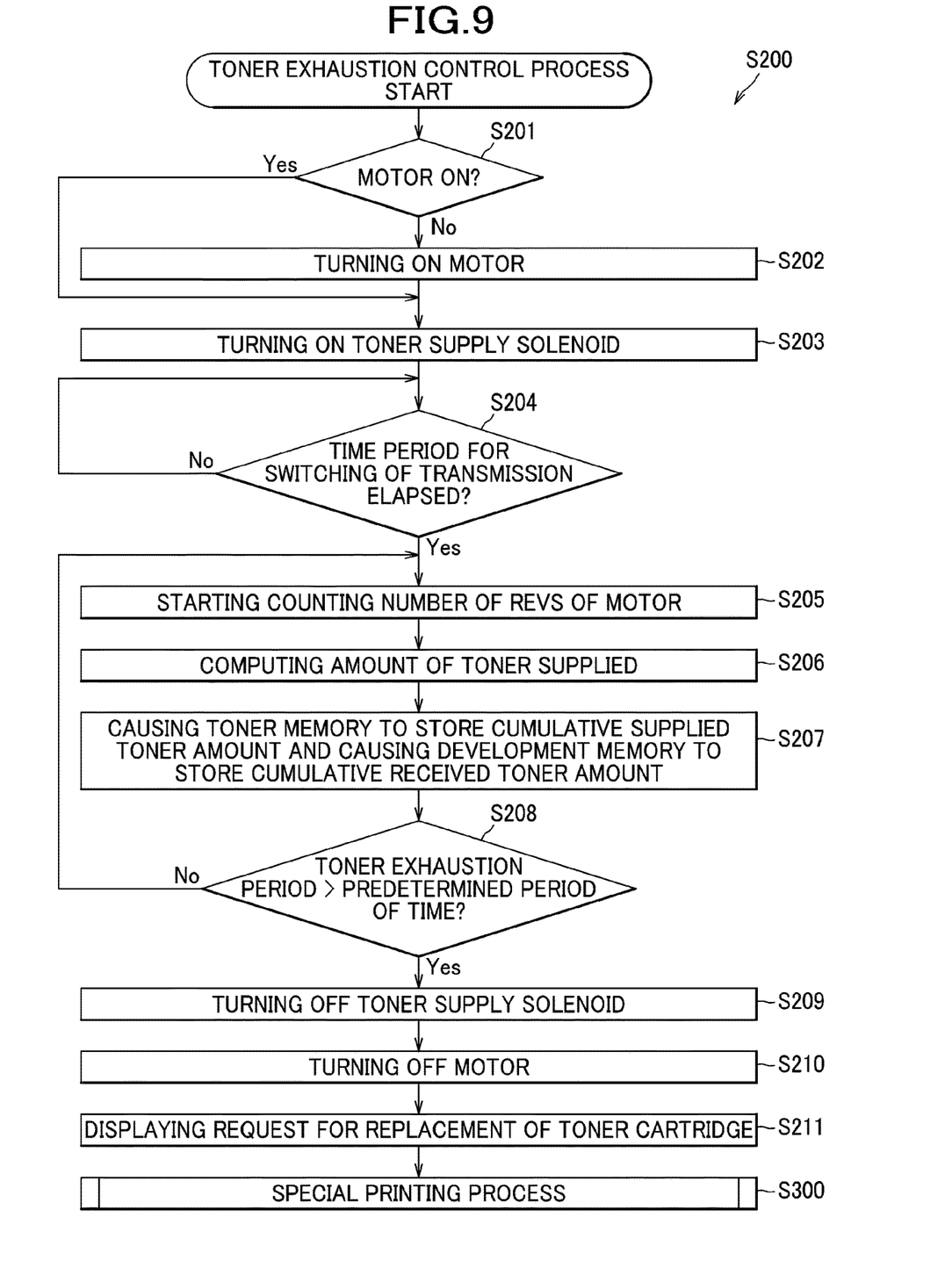
FIG. 9 is a flowchart showing a toner exhaustion control process.

Specifically, in the toner exhaustion control process, the controller 200 turns on the toner supply solenoid 28 and keeps it activated for a predetermined period of time to cause the auger 22 to supply toner remaining in the case 21 of the toner cartridge 2 into the development chamber 11 (see steps S203 to S209 in FIG. 9). The controller 200 stores, in the development memory 16, updated information regarding the cumulative received toner amount obtained by adding, to the cumulative received toner amount stored in the development memory 16, an amount of toner supplied from the case 21 of the toner cartridge 2 and received in the development chamber 11 by the toner exhaustion control process. The controller 200 stores, in the toner memory 26, updated information regarding the cumulative supplied toner amount obtained by adding, to the cumulative supplied toner amount stored in the toner memory 26, an amount of toner supplied by the auger 22 from the case 21 of the toner cartridge 2 into the development chamber 11 by the toner exhaustion control process.

Subsequently, the controller 200 causes the display 180 to show a representation for requesting replacement of the toner cartridge 2, and proceeds to execute the special printing process.

Next, the special printing process (see step S300 in FIG. 10) is described below. The special printing process is a process, to be executed when it is determined that the toner cartridge 2 is empty or when it is determined that the toner cartridge 2 is not installed, of executing an image forming process to some limited extent by making use of toner remaining in the case 21 of the toner cartridge 2.

Figure 10:
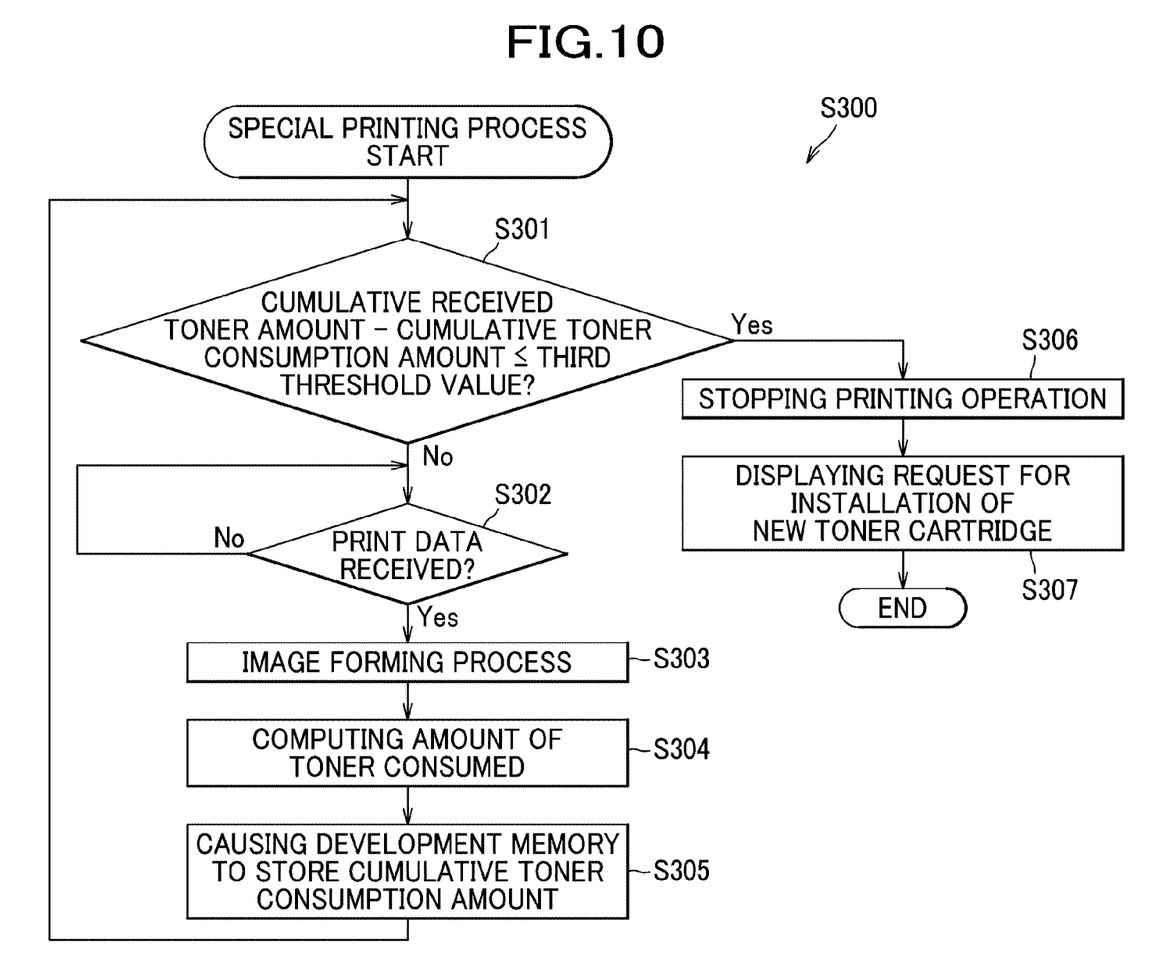
FIG. 10 is a flowchart showing a special printing process.

Specifically, the controller 200 permits an image forming process to be executed until the difference found by subtracting the cumulative toner consumption amount from the cumulative received toner amount becomes equal to or smaller than a third threshold value (see steps S301 to S305 in FIG. 10). In other words, the controller 200 subtracts the cumulative toner consumption amount from the cumulative received toner amount to find a difference, and when the difference is greater than the third threshold value, then proceeds to execute an image forming process, and otherwise (when the difference is not greater than the third threshold value), does not proceed to execute an image forming process. The third threshold value is a value smaller than the first threshold value.

Next, one example of the process executed by the controller 200 according to an illustrative, non-limiting embodiment is described below with reference to the flowcharts shown in FIGS. 5 to 10. The discussion first extended referring to FIG. 5 and FIG. 6 focuses on a process to be executed, when the power is turned on or the cover is closed, for selecting one of the processes from among the normal printing process, the toner exhaustion control process and the special printing process.

As shown in FIG. 5, the controller 200 determines whether the power to the image forming apparatus 100 has been turned on and whether the front cover 123 has been closed (S1). When the controller 200 determines that the power has not been turned on or that the front cover 123 has not been closed (No in step S1), the controller 200 waits until the power to the image forming apparatus 100 is turned on or the front cover 123 is closed.

When the controller 200 determines that the power to the image forming apparatus 100 has been turned on or the front cover 123 has been closed (Yes in step S1), the controller 200, assuming that the development cartridge 1 and/or the toner cartridge 2 has been changed, retrieves information regarding the cumulative received toner amount and the cumulative toner consumption amount from the development memory 16 (S2), retrieves information regarding the cumulative supplied toner amount from the toner memory 26 (S3), and determines whether a development cartridge 1 is installed in the main body 120 (S4). Determination as to whether a development cartridge 1 is installed in the main body 120 may be made through attempts to establish communication for retrieving information from the development memory 16 in step S2; thus, when communication is established successfully, the controller 200 ascertains that the development cartridge 1 is installed in the main body 120.

When the controller 200 determines, in step S4, that a development cartridge 1 is not installed (No in step S4), then the controller 200 causes the display 180 to show a representation for requesting installation of a development cartridge 1 (S5), and brings the process to an end.

When the controller 200 determines, in step S4, that a development cartridge 1 is installed (Yes in step S4), then the controller 200 proceeds to determine whether a toner cartridge 2 is installed in the development cartridge 1 (S6). Determination as to whether a toner cartridge 2 is installed in the development cartridge 1 may be made through attempts to establish communication for retrieving information from the toner memory 26 in step S3; thus, when communication is established successfully, the controller 200 ascertains that the toner cartridge 2 is installed in the development cartridge 1.

When the controller 200 determines, in step S6, that a toner cartridge 2 is not installed (No in step S6), then the controller 200 causes the display 180 to show a representation for requesting installation of a toner cartridge 2 (S7), and proceeds to execute a special printing process (S300).

When the controller 200 determines that a toner cartridge 2 is installed (Yes in step S6), then the controller 200 proceeds to determine whether the development cartridge 1 is brand-new (S8). Determination as to whether the development cartridge 1 is brand-new may be made on the basis of the cumulative received toner amount retrieved from the development memory 16 in step S22; thus, when the cumulative received toner amount is zero, the controller 200 ascertains that the development cartridge 1 installed in the main body 120 is brand-new.

When the controller 200 determines, made in step S8, that the development cartridge 1 is brand-new (Yes in step S8), then the controller 200 turns on the toner supply solenoid 28 and keeps it activated for a predetermined period of time (S9) to cause the auger 22 to supply a second predetermined amount of toner into the development chamber 11 of the development cartridge 1.

After step S9, the controller 200 stores, in the development memory 16, a cumulative received toner amount that is an amount of toner supplied into the development chamber 11 in step S9, and stores, in the toner memory 26, a cumulative supplied toner amount that is the amount of toner supplied in step S9 (S10), and proceeds to step S11.

When the controller 200 determines, in step S8, that the development cartridge 1 is not brand-new (No in step S8), then the controller 200 proceeds to step S11. In step S11, the controller 200 determines whether the cumulative supplied toner amount is equal to or greater than the fourth threshold value.

When the controller 200 determines, in step S11, that the cumulative supplied toner amount is not equal to or greater than the fourth threshold value (No in step S11), then the controller 200, assuming that there remains a sufficient amount of toner in the toner cartridge 2, proceeds to execute the normal printing process (S100).

When the controller 200 determines, in step S11, that the cumulative supplied toner amount is equal to or greater than the fourth threshold value (Yes in step S11), then the controller 200 proceeds to determine whether the cumulative supplied toner amount is equal to or greater than the second threshold value (S12).

When the controller 200 determines, in step S12, that the cumulative supplied toner amount is equal to or greater than the second threshold value (Yes in step S12), then the controller 200 causes the display 180 to show a representation for requesting replacement of the toner cartridge 2 (S13), and proceeds to execute the special printing process (S300).

When the controller 200 determines, in step S12, that the cumulative supplied toner amount is not equal to or greater than the second threshold value (No in step S12), then the controller 200 proceeds to execute the toner exhaustion control process (S200).

Next, referring to the flowcharts of FIG. 7 and FIG. 8, one example of the normal printing process is described below.

As shown in FIG. 7, in the normal printing process S100, the controller 200 determines whether print data has been received (S101), and when it turns out that print data has been received (Yes in step S101), then proceeds to execute an image forming process (S102).

After step S102, the controller 200 computes a cumulative toner consumption amount based on a dot count of an image formed in the image forming process (S103), subtracts the cumulative toner consumption amount from the cumulative received toner amount to find a difference, and determines whether the difference is equal to or smaller than the first threshold value (S104).

When the controller 200 determines, in step S104, that the difference found by subtracting the cumulative toner consumption amount from the cumulative received toner amount is not equal to or smaller than the first threshold value (No in step S104), then the controller 200 brings the process back to step S101.

When the controller 200 determines, in step S104, that the difference found by subtracting the cumulative toner consumption amount from the cumulative received toner amount is equal to or smaller than the first threshold value (Yes in step S104), then the controller 200 turns on the toner supply solenoid 28 (S105), waits until a time period for switching of the transmission 27 has elapsed (S106), and when elapsed, starts counting the number of rotations of the motor 300 (S107).

After step S107, as shown in FIG. 8, the controller 200 computes, in step S108, an amount of toner supplied from a time at which the counting of the number of rotations of the motor 300 has been started (S107), and determines, in step S109, whether the number of rotations of the motor 300 is equal to or greater than a predetermined value.

When the controller 200 determines, in step S109, that the number of rotations of the motor 300 is not equal to or greater than the predetermined value (No in step S109), then the controller 200 determines whether toner is supplied without trouble (S111). When the controller 200 determines, in step S111, that toner is supplied without trouble (Yes in step S111), then the controller 200 repeats the process from step S108, while when the controller 200 determines, in step S111, that toner supply is not free from trouble (No in step S111), then the controller 200 turns off the toner supply solenoid 28 (S112).

When the controller 200 determines, in step S109, that the number of rotations of the motor 300 is equal to or greater than the predetermined value (Yes in step S109), then the controller 200 subtracts the cumulative toner consumption amount from the cumulative received toner amount to find a difference, and determines whether the difference is equal to or smaller than the first threshold value (S110).

When the controller 200 determines, in step S110, that the difference found by subtracting the cumulative toner consumption amount from the cumulative received toner amount is equal to or smaller than the first threshold value (Yes in step S110), then the controller 200 determines whether toner is supplied without trouble (S111). When the controller 200 determines, in step S111, that toner is supplied without trouble (Yes in step S111), then the controller 200 repeats the process from step S108, while when the controller 200 determines, in step S111, that toner supply is not free from trouble (No in step S111), then the controller 200 turns off the toner supply solenoid 28 (S112).

When the controller 200 determines, in step S110, that the difference found by subtracting the cumulative toner consumption amount from the cumulative received toner amount is not equal to or smaller than the first threshold value (No in step S110), then the controller 200 turnes off the toner supply solenoid 28 (S112).

After step S112, the controller 200 stores, in the development memory 16, a cumulative received toner amount and a cumulative toner consumption amount and stores, in the toner memory 26, a cumulative supplied toner amount (S113), and determines whether the cumulative supplied toner amount is equal to or greater than the fourth threshold value (S114).

When the controller 200 determines, in step S114, that the cumulative supplied toner amount is not equal to or greater than the fourth threshold value (No in step S114), then the controller 200 brings the process back to step S101 to continue to execute the normal printing process.

When the controller 200 determines, in step S114, that the cumulative supplied toner amount is equal to or greater than the fourth threshold value (Yes in step S114), then the controller 200 proceeds to execute the toner exhaustion control process (S200).

Next, referring to the flowchart of FIG. 9, one example of the toner exhaustion control process is described below.

As shown in FIG. 9, in the toner exhaustion control process, when the motor 300 has not been turned on (No in step S201), the motor 300 is turned on (S202), and the toner supply solenoid 28 is turned on (S203).

After step S203, the controller 200 waits until a time period for switching of the transmission 27 has elapsed (S204), and when elapsed, starts counting the number of rotations of the motor 300 (S205), and thereafter computes, in step S206, an amount of toner supplied after the start of counting (S205) of the number of rotations of the motor 300.

After step S206, the controller 200 stores, in the toner memory 26, a cumulative supplied toner amount, and stores, in the development memory 16, a cumulative received toner amount (S207). Thereafter, the controller 200 determines whether a time period elapsed from a time of the start of counting in step S205 (i.e., toner exhaustion period) has exceeded a predetermined period of time (S208).

When the controller 200 determines, in step S208, that the toner exhaustion period has not exceeded the predetermined period of time (No in step S208), then the controller 200 brings the process back to step S205, while when the controller 200 determines, in step S208, that the toner exhaustion period has exceeded the predetermined period of time (Yes in step S208), then the controller 200 turns off the toner supply solenoid 28 (S209) and turns off the motor 300 (S210), causes the display 180 to show a representation for requesting replacement of the toner cartridge 2 (S211), and proceeds to execute the special printing process (S300).

Next, referring to the flowchart of FIG. 10, one example of the special printing process is described below.

As shown in FIG. 10, in the special printing process S300, the controller 200 subtracts the cumulative toner consumption amount from the cumulative received toner amount to find a difference, and determines whether the difference is equal to or smaller than the third threshold value (S301).

When the controller 200 determines, in step S301, that the difference found by subtracting the cumulative toner consumption amount from the cumulative received toner amount is not equal to or smaller than the third threshold value (No in step S301), the controller 200 waits until print data has been received (S302), and when it turns out that print data has been received (Yes in step S302), then proceeds to execute an image forming process (S303).

After step S303, the controller 200 computes an amount of toner consumed for the image forming process (S304), stores, in the development memory 16, updated information regarding the cumulative toner consumption amount obtained by adding the computed amount of consumed toner to the cumulative toner consumption amount stored in the development memory 16 (S305), and brings the process back to step S301.

When the controller 200 determines, in step S301, that the difference found by subtracting the cumulative toner consumption amount from the cumulative received toner amount is equal to or smaller than the third threshold value (Yes in step S301), the controller 200, assuming that the amount of toner remaining in the development chamber 11 is not sufficient for the image forming process, stops the printing operation (S306), causes the display 180 to show a representation for requesting installation of a new toner cartridge 2 (S307), and brings the process to an end.

In the image forming apparatus 100 as described above, the following advantageous effects can be achieved.

According to the image forming apparatus 100, the cumulative received toner amount and the cumulative toner consumption amount of the development cartridge 1 can be stored in the development memory 16 and the cumulative supplied toner amount of the toner cartridge 2 can be stored in the toner memory 26. Accordingly, in the image forming apparatus 100, even if the development cartridge 1 or the toner cartridge 2 is replaced before expiration of its life and a development cartridge 1 or toner cartridge 2 removed before expiration of its life is installed again, the controller 200 can ascertain the amounts of toner remaining in the development cartridge 1 and the toner cartridge 2, respectively.

Since the controller 200 is configured to acquire the cumulative supplied toner amount based on the number of rotations of the motor 300 which causes the auger 22 as a toner supply unit to rotate, the controller 200 can determine the cumulative supplied toner amount precisely.

Since the controller 200 is configured to store, in the development memory 16, the cumulative toner consumption amount as determined based on a dot count of an image formed by the image forming apparatus 100, the controller 200 can determine the cumulative toner consumption amount precisely.

The controller 200 is configured to execute a toner supply process of causing the toner supply unit (auger 22) to supply a second predetermined amount of toner into the development chamber 11 when the controller 200 determines, in the brand-new check process, that the development cartridge 1 installed in the main body 120 is brand-new. Therefore, even when a brand-new development cartridge 1 is installed in the main body 120, the controller 200 can keep the amount of toner in the development chamber 11 at a specified level.

The controller 200 is configured to execute a process of permitting an image forming process to be executed, when the controller 200 determines, in the first installation check process, that the development cartridge 1 is installed in the main body 120, and determines, in the empty check process, that the cumulative amount of toner supplied from the case 21 of the toner cartridge 2 is equal to or greater than the second threshold value, until the difference found by subtracting the cumulative toner consumption amount from the cumulative received toner amount becomes equal to or smaller than the third threshold value. Therefore, the controller 200 can execute an image forming process to some limited extent, even if it is determined that the toner cartridge 2 is empty.

The controller 200 is configured to execute a process of permitting an image forming process to be executed, when the controller 200 determines, in the first installation check process, that the development cartridge 1 is installed in the main body 120, and does not determine, in the second installation check process, that the toner cartridge 2 is installed in the development cartridge 1, until the difference found by subtracting the cumulative toner consumption amount from the cumulative received toner amount becomes equal to or smaller than a third threshold value. Therefore, the controller 200 can execute an image forming process to some limited extent, even if the toner cartridge 2 is not installed, as long as the development cartridge 1 is installed.

The controller 200 is configured to compute the cumulative received toner amount by adding up an amount of toner supplied by the toner supply unit of the toner cartridge installed in the development cartridge 1. Therefore, the controller 200 can obtain the cumulative received toner amount with great precision.

The above-described embodiment may be modified and implemented in various forms as will be described below.

Although the first threshold value in the above-described embodiment is determined based on the ideal amount of toner to be stored in the development chamber 11 when the image forming process is executed, the first threshold value may be determined with reference to the third threshold value. In this instance, the third threshold value may be determined based on the ideal amount of toner, and then the first threshold value may be determined with reference to the third threshold value; that is, the first threshold value may be any value greater than the third threshold value.

In the above-described embodiment, the development cartridge 1 comprises the photoconductor drum 10; however, the development cartridge 1 may not comprise a photoconductor drum 10.

In the above-described embodiment, the toner supply unit is exemplified by the auger 22 having the helical blade 22B, but the toner supply unit may have a shaft and a flat plate provided parallel to the shaft.

In the above-described embodiment, the photoconductor drum 10 is illustrated as an example of a photoconductor, but a belt-shaped photoconductor may also be used instead.

In the above-described embodiment, the cumulative toner consumption amount is determined based on a dot count of an image formed by the image forming apparatus, but the toner consumption amount may be acquired, for example, based on the number of sheets on which an image is formed, the number of rotations of the photoconductor drum, the number of occurrences of detection of sheets acquired from an output signal of a sheet sensor, or the like.

The sheet S may be a cardboard, a postcard, a flimsy, or other sheet made of paper or other material, or an OHP sheet, or the like.

In the above-described embodiment, the image forming apparatus is exemplified by the monochrome laser printer; however, the image forming apparatus may be a multicolor laser printer, or other types of image forming apparatuses such as a copier, a multifunction peripheral, etc.

The elements described in the above embodiment and its modified examples may be implemented selectively and in combination.

What is claimed is:

1. An image forming apparatus comprising:
    a main body;
    a development cartridge installable in the main body, the development cartridge comprising a development roller, a development chamber in which toner is storable, and a development memory;
    a toner cartridge installable in the development cartridge, the toner cartridge comprising a case in which toner is stored, a toner supply unit configured to supply toner from the case into the development chamber, and a toner memory; and
    a controller configured to:
        store, in the development memory, information regarding a cumulative received toner amount that is a cumulative amount of toner supplied from the case and received in the development chamber, and a cumulative toner consumption amount that is a cumulative amount of consumed toner;
        subtract the cumulative toner consumption amount from the cumulative received toner amount to find a difference, and cause the toner supply unit to supply a first predetermined amount of toner into the development chamber when the difference is equal to or smaller than a first threshold value; and
        store, in the toner memory, information regarding a cumulative supplied toner amount that is a cumulative amount of toner supplied by the toner supply unit from the case into the development chamber.

2. The image forming apparatus according to claim 1, further comprising a motor,
    wherein the toner supply unit is an auger rotatable about a rotation axis to thereby supply toner, and
    wherein the controller is configured to acquire the cumulative supplied toner amount based on the number of rotations of the motor.

3. The image forming apparatus according to claim 1, wherein the controller is configured to store, in the development memory, the cumulative toner consumption amount as determined based on a dot count of an image formed by the image forming apparatus.

4. The image forming apparatus according to claim 1, wherein the controller is configured to execute:
    a brand-new check process of determining whether the development cartridge installed in the main body is brand-new; and
    a toner supply process of causing the toner supply unit to supply a second predetermined amount of toner into the development chamber, wherein the toner supply process is to be executed when the controller determines that the development cartridge installed in the main body is brand-new in the brand-new check process.

5. The image forming apparatus according to claim 1, wherein the controller is configured to execute:
- a first installation check process of determining whether the development cartridge is installed in the main body;
- an empty check process of determining whether the cumulative supplied toner amount is equal to or greater than a second threshold value for determining whether the toner cartridge is empty; and
- a process of permitting an image forming process to be executed, when the controller determines that the development cartridge is installed in the main body in the first installation check process and determines that the cumulative supplied toner amount is equal to or greater than the second threshold value in the empty check process, until the difference found by subtracting the cumulative toner consumption amount from the cumulative received toner amount becomes equal to or smaller than a third threshold value.

6. The image forming apparatus according to claim 1, wherein the controller is configured to execute:
- a first installation check process of determining whether the development cartridge is installed in the main body;
- a second installation check process of determining whether the toner cartridge is installed in the development cartridge; and
- a process of permitting an image forming process to be executed, when the controller determines that the development cartridge is installed in the main body in the first installation check process and does not determine that the toner cartridge is installed in the development cartridge in the second installation check process, until the difference found by subtracting the cumulative toner consumption amount from the cumulative received toner amount becomes equal to or smaller than a third threshold value.

7. The image forming apparatus according to claim 1, wherein the controller is configured to execute, when the cumulative supplied toner amount is equal to or greater than a fourth threshold value, a toner exhaustion control process of causing the toner supply unit to operate until toner remaining in the case is exhausted completely, and
wherein the controller is configured to:
- store, in the development memory, updated information regarding the cumulative received toner amount obtained by adding, to the cumulative received toner amount stored in the development memory, an amount of toner supplied from the case and received in the development chamber by the toner exhaustion control process; and
- store, in the toner memory, updated information regarding the cumulative supplied toner amount obtained by adding, to the cumulative supplied toner amount stored in the development memory, an amount of toner supplied by the toner supply unit from the case into the development chamber by the toner exhaustion control process.

8. The image forming apparatus according to claim 1, wherein the controller is configured to compute the cumulative received toner amount by adding up an amount of toner supplied by the toner supply unit of the toner cartridge installed in the development cartridge.

9. The image forming apparatus according to claim 1, wherein the development cartridge further comprises a photoconductor drum.

10. An image forming apparatus comprising:
- a main body;
- a development cartridge installable in the main body, the development cartridge comprising a development roller, a development chamber in which toner is storable, and a development memory;
- a toner cartridge installable in the development cartridge, the toner cartridge comprising a case in which toner is stored, a toner supply unit configured to supply toner from the case into the development chamber, and a toner memory; and
- a controller configured to store, in the development memory, information regarding a cumulative received toner amount that is a cumulative amount of toner supplied from the case and received in the development chamber, and a cumulative toner consumption amount that is a cumulative amount of consumed toner.

11. The image forming apparatus according to claim 10, wherein the controller is configured to store, in the development memory, the cumulative toner consumption amount as determined based on a dot count of an image formed by the image forming apparatus.

12. The image forming apparatus according to claim 10, wherein the controller is configured to execute:
- a brand-new check process of determining whether the development cartridge installed in the main body is brand-new; and
- a toner supply process of causing the toner supply unit to supply a second predetermined amount of toner into the development chamber, wherein the toner supply process is to be executed when the controller determines that the development cartridge installed in the main body is brand-new in the brand-new check process.

13. The image forming apparatus according to claim 10, wherein the controller is configured to compute the cumulative received toner amount by adding up an amount of toner supplied by the toner supply unit of the toner cartridge installed in the development cartridge.

14. The image forming apparatus according to claim 10, wherein the development cartridge further comprises a photoconductor drum.

15. The image forming apparatus according to claim 10, wherein the cumulative received toner amount stored in the development memory is equal to zero when the development cartridge installed in the main body is brand-new.

16. The image forming apparatus according to claim 10, wherein the cumulative received toner amount stored in the development memory is larger than the cumulative toner consumption amount stored in the development memory.

* * * * *